(12) United States Patent
Waible et al.

(10) Patent No.: US 10,202,105 B2
(45) Date of Patent: Feb. 12, 2019

(54) CLEANING ARRANGEMENT FOR THE CLEANING OF VEHICLE WINDOWS, AND WIPER DEVICE

(71) Applicant: Valeo Systèmes d'Essuyage, Le Mesnil Saint Denis (FR)

(72) Inventors: Siegfried Waible, Flein (DE); Kristina Kalmbach, Bietigheim-Bissingen (DE); Claudia Schober, Marbach (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 100 days.

(21) Appl. No.: 15/257,080

(22) Filed: Sep. 6, 2016

(65) Prior Publication Data
US 2017/0066415 A1 Mar. 9, 2017

(30) Foreign Application Priority Data
Sep. 7, 2015 (DE) .......................... 10 2015 114 928

(51) Int. Cl.
| | | |
|---|---|---|
| *B60S 1/52* | (2006.01) | |
| *B60S 1/38* | (2006.01) | |
| *B60S 1/48* | (2006.01) | |
| *B60S 1/42* | (2006.01) | |
| *B60S 1/34* | (2006.01) | |

(52) U.S. Cl.
CPC .............. *B60S 1/522* (2013.01); *B60S 1/3856* (2013.01); *B60S 1/3862* (2013.01); *B60S 1/42* (2013.01); *B60S 1/488* (2013.01); *B60S 1/524* (2013.01); *B60S 1/3415* (2013.01); *B60S 1/3436* (2013.01)

(58) Field of Classification Search
CPC ........ B60S 1/522; B60S 1/3862; B60S 1/488; B60S 1/3891; B60S 1/3887

USPC .......................................... 15/250.04–250.09
See application file for complete search history.

(56) References Cited

U.S. PATENT DOCUMENTS

| | | | | |
|---|---|---|---|---|
| 2011/0107541 A1* | 5/2011 | Caillot | ................. | B60S 1/3862 15/250.04 |
| 2015/0026910 A1* | 1/2015 | Boland | ................. | B60S 1/3808 15/250.201 |

FOREIGN PATENT DOCUMENTS

| | | |
|---|---|---|
| DE | 4303113 A1 | 8/1994 |
| DE | 19934346 A1 | 2/2001 |
| DE | 102004007351 A1 | 9/2005 |

OTHER PUBLICATIONS

Search Report Issued in Corresponding German Application No. 10 2015 114 928.1, dated Jul. 20, 2016 (7 Pages).

* cited by examiner

*Primary Examiner* — Andrew A Horton
(74) *Attorney, Agent, or Firm* — Osha Liang LLP

(57) ABSTRACT

The invention relates to a cleaning arrangement (40) for the cleaning of vehicle windows, wherein the cleaning arrangement (40) has a base body (131) with at least one spray opening (42, 43), wherein the base body (131) is able to be connected to a wiper arm (10), and wherein the base body (131) has a supply connection (51) for a cleaning fluid, which supply connection (51) is hydraulically connected to the spray opening (42, 43) via a connecting duct (121). According to the invention, it is provided that a feed connection (141) branches off from the connecting duct (121), which feed connection (141) opens in a connecting chamber (140) of the base body (131), and that the connecting chamber (140) is able to be closed by means of a closure cap (95).

13 Claims, 12 Drawing Sheets

CLEANING ARRANGEMENT FOR THE CLEANING OF VEHICLE WINDOWS, AND WIPER DEVICE

PRIOR ART

Figure 1:
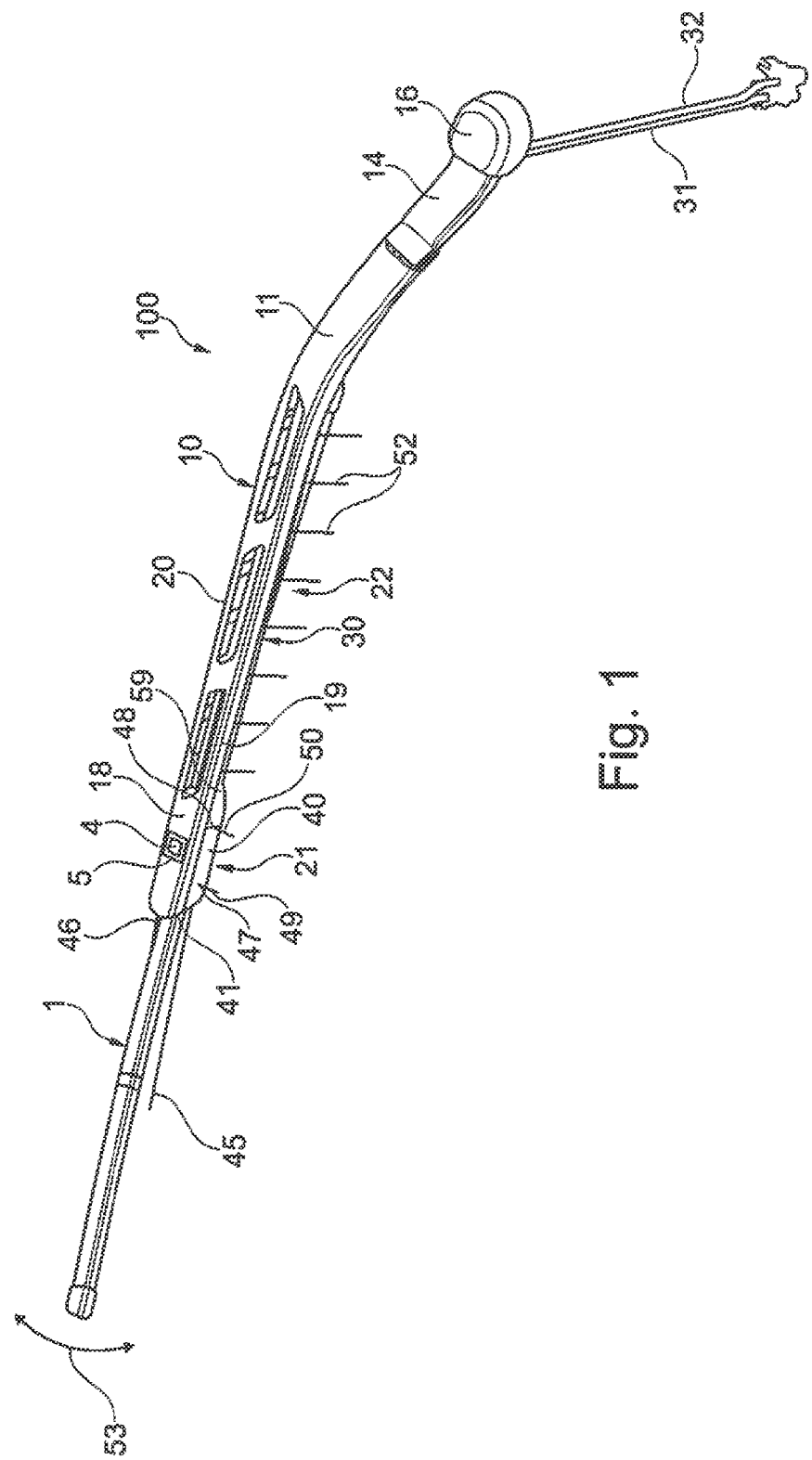

The invention relates to a cleaning arrangement for the cleaning of vehicle windows, as per the preamble of claim 1. The invention also relates to a wiper device using a cleaning arrangement according to the invention.

A cleaning arrangement according to the preamble of claim 1 is known from DE 10 2004 007 351 A1. The known cleaning arrangement is accommodated within a cross section of a wiper arm and is directly connected to the wiper arm. Spaced apart from the cleaning arrangement, a wiper blade is exchangeably fastened within the mount of the wiper arm by way of a fastening arrangement. The cleaning arrangement has multiple spray nozzles which are arranged in the region of the two longitudinal sides of the wiper blade in order to be able to apply a cleaning liquid to the vehicle window directly in front of the wiper blade in a manner dependent on the direction of movement of the wiper blade. For this purpose, within the cleaning arrangement, there are provided two feed ducts which are in each case hydraulically connected to at least one spray nozzle. The ducts are connected to one another by way of a common branch which simultaneously serves for the feed of the cleaning liquid from a hose line. Heating of the ducts in order to prevent freezing of the cleaning liquid in the ducts in the presence of low outside temperatures is not provided in the cited document.

From the prior art, cleaning arrangements for vehicle windows are also known in which a heating wire is arranged for example within a cleaning hose or in a feed duct for the cleaning liquid. Here, however, it is a problem if, as is provided in the documents cited in the introduction, multiple feed ducts to the individual spray nozzles are provided for the cleaning liquid. Said feed ducts are then, in practice, normally heated by way of in each case one separate heating element or heating wire.

DISCLOSURE OF THE INVENTION

Proceeding from the prior art discussed, it is the object of the invention to further develop a cleaning arrangement for the cleaning of vehicle windows, as per the preamble of claim 1, such that, for the case of a heating arrangement, the cleaning device that is provided can be equipped as easily as possible with at least one corresponding heating element or a corresponding heating wire. It is thus sought to realize a cleaning device which can selectively be of heatable or non-heatable form depending on customer demand.

Said object is achieved with a cleaning arrangement for the cleaning of vehicle windows having the features of claim 1.

Here, the invention is based on the concept of providing a feed connection which opens in a connecting chamber of a base body of the cleaning arrangement, wherein the connecting chamber is able to be dosed by means of a closure cap. In this way, it is possible for a heating element, in particular a heating wire, to be inserted into or arranged in the region of the connecting duct with the spray opening via the supply connection. By contrast, in the case of the embodiment of a non-heated cleaning arrangement, no heating element is provided within the feed connection or connecting chamber.

Advantageous refinements of the cleaning arrangement according to the invention for the cleaning of vehicle windows are specified in the subclaims. The invention encompasses all combinations of at least two features disclosed in the claims, in the description and/or in the figures.

In order to make it possible for the closure cap to be connected to the base body, and dismounted from the base body again if necessary, as easily as possible, it is provided that the closure cap is connected with the base body by means of a snap-on connection.

A preferred arrangement of the heating wire or heating element provides that said heating wire or heating element is arranged within the feed connection and the connecting duct between the supply connection for the cleaning liquid and the branch from which the feed connection extends.

In a very particularly preferred design refinement, which makes it possible to use a single heating wire or a single heating element to heat connecting ducts arranged on different longitudinal sides or on different regions of the cleaning arrangement, provides that two connecting ducts are provided which are arranged parallel to one another and associated respectively with a longitudinal side of a wiper blade, and that a single heating element is provided, which is arranged in the connecting chamber and projects with sections facing away from one another via a respective feed connection into the respective connecting duct.

To prevent an escape of cleaning liquid out of the region of the cleaning device, it is furthermore provided that the feed connection and/or the connecting chamber is sealed hydraulically. Such a seal is preferably realized in that the seal takes place by means of a sealing element and/or by means of a sealing material arranged in the feed connection, preferably in the opening region to the connecting chamber.

A further preferred refinement of the cleaning device provides that the closure cap is constructed to close, in a surface flash manner, the end region of a wiper arm which is open at the face side.

In this way, the cross section of the wiper arm is protected against the ingress of dirt or the like at its end region by the closure cap. The invention also encompasses a wiper device for the cleaning of vehicle windows, with a wiper arm and with a wiper blade, fastened in an exchangeable manner on the wiper arm by means of a fastening arrangement, and with a cleaning arrangement according to the invention.

In a preferred refinement of a wiper device of said type, which permits a particularly compact construction of said wiper arm, it is provided that the cleaning arrangement is fastened directly on the wiper arm and the fastening arrangement is fastened directly on the cleaning arrangement.

Further advantages, features and details of the invention will emerge from the following description of a preferred exemplary embodiments and on the basis of the drawing.

Figure 2:
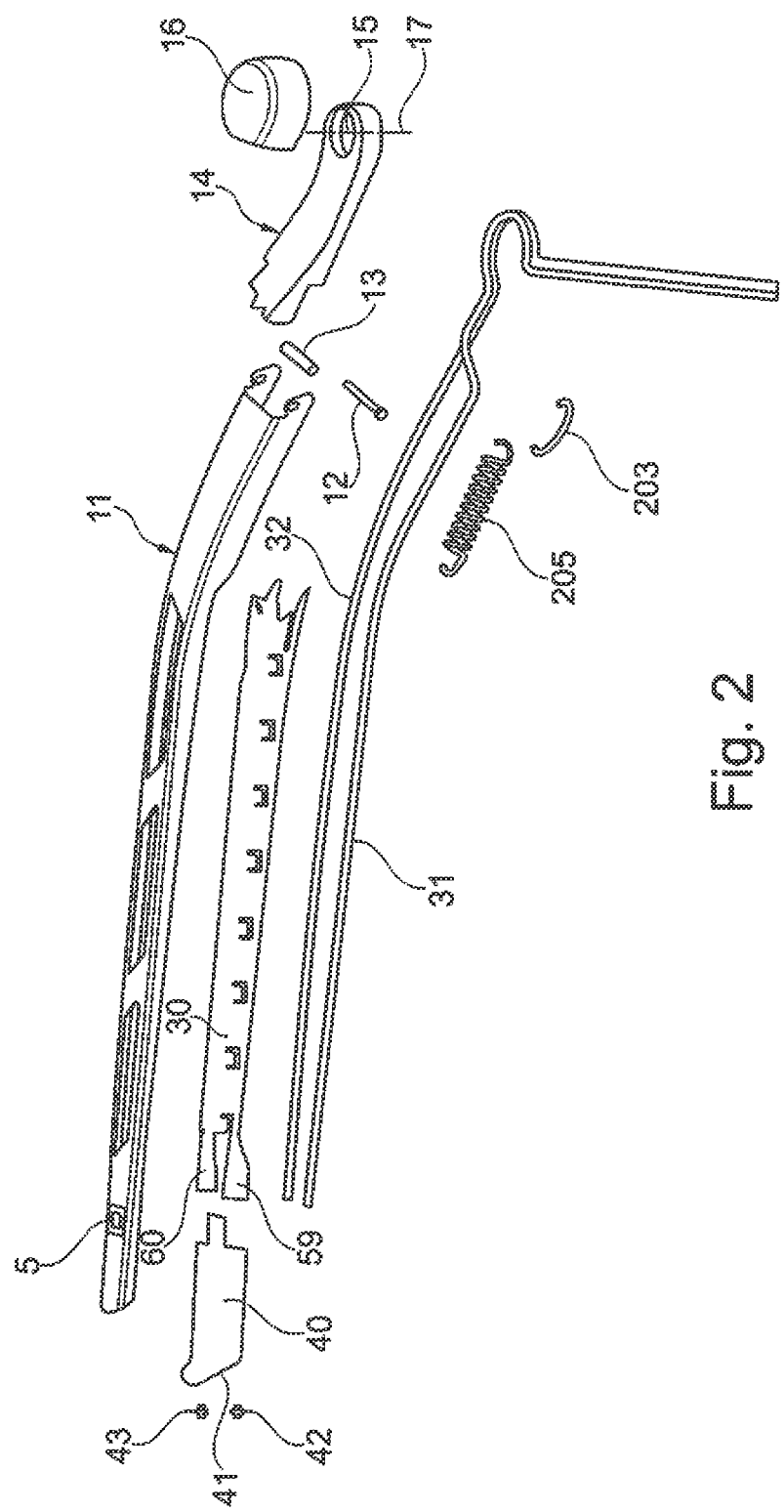
Figure 3:
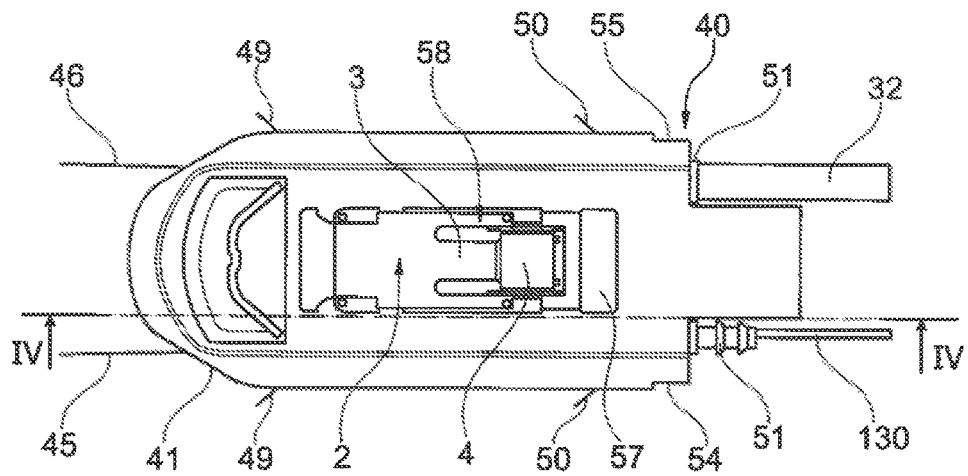
Figure 4:
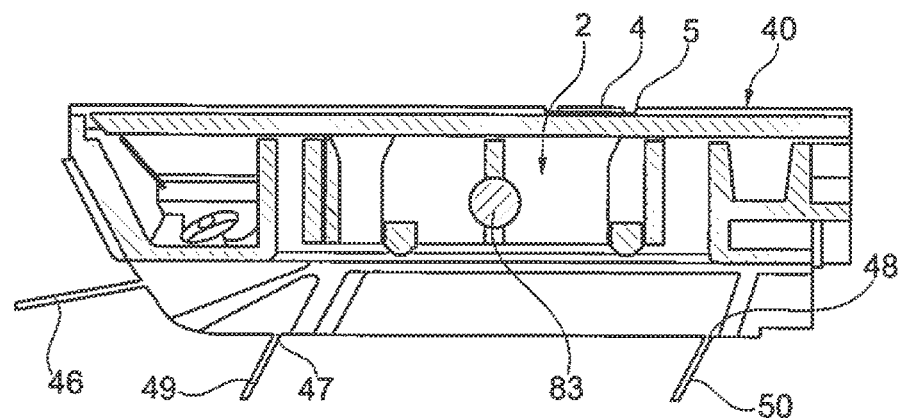
Figure 5:
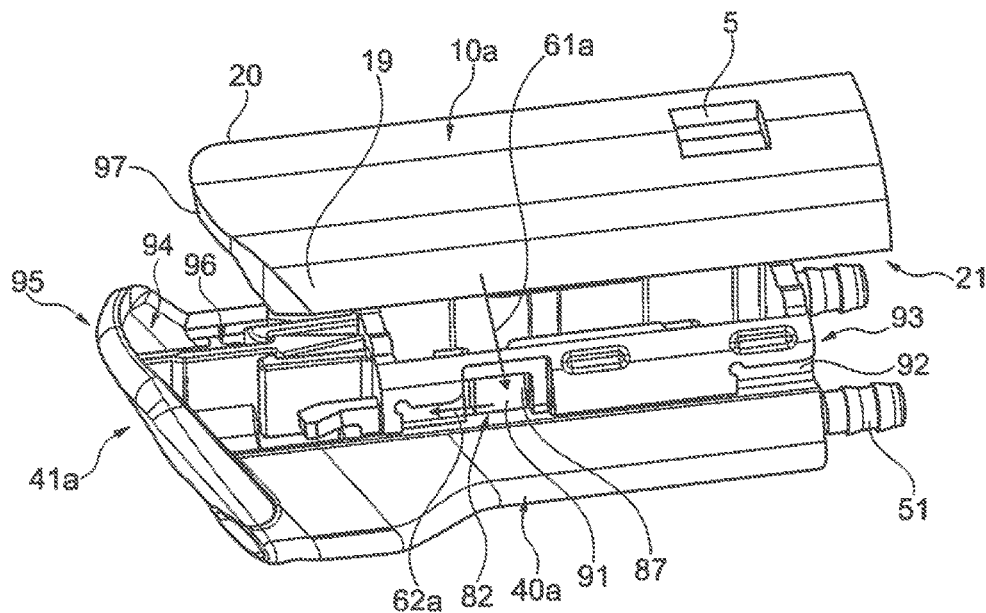
Figure 6:
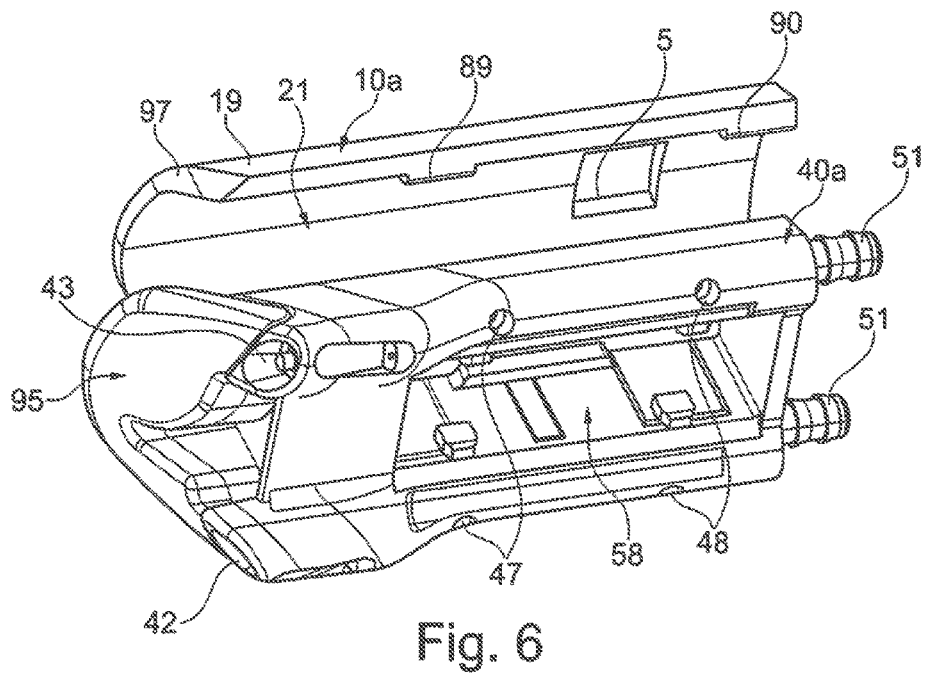
Figure 7:
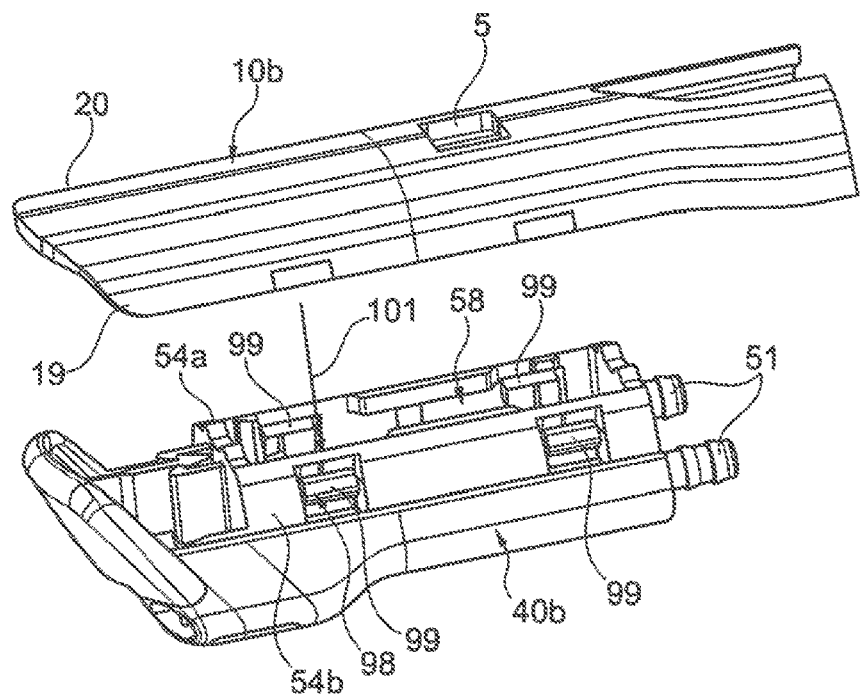
Figure 8:
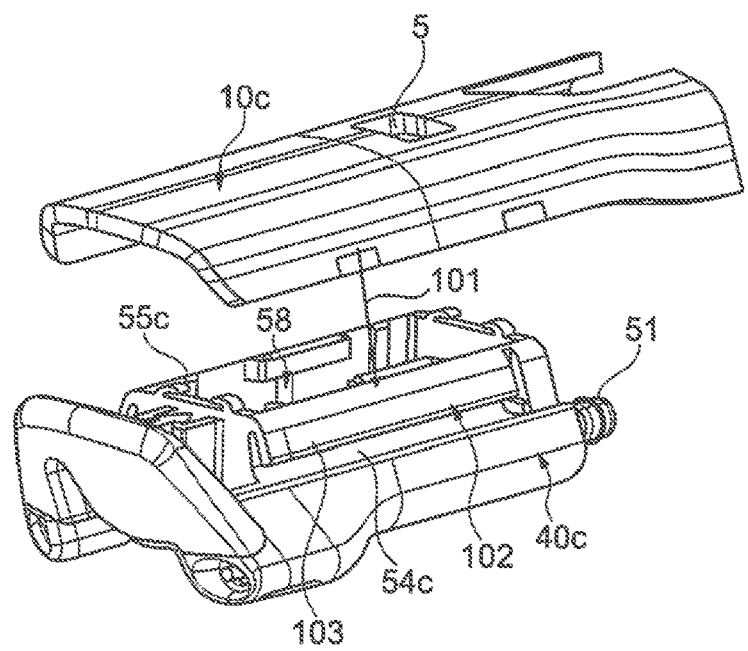
Figure 9:
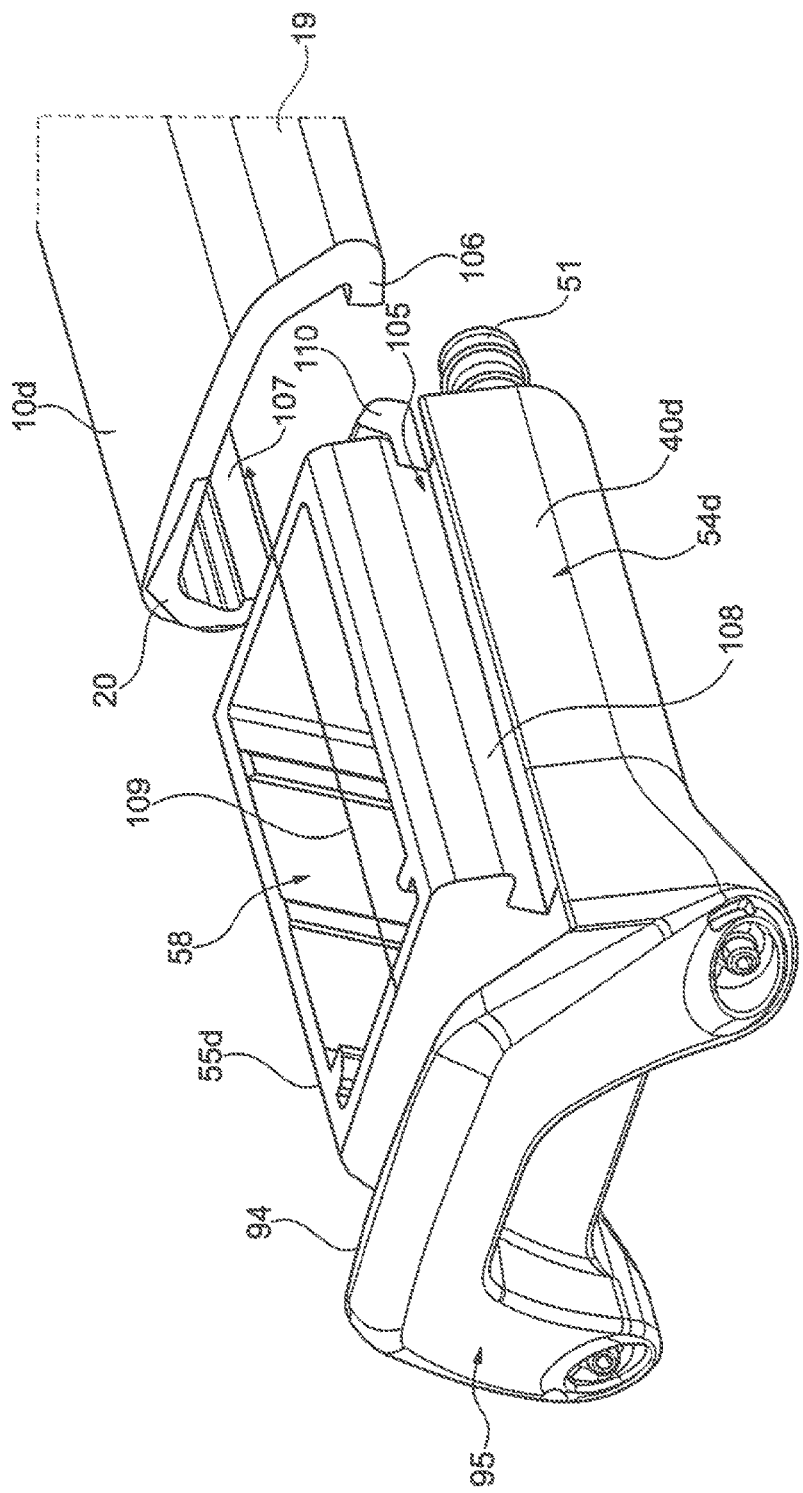
Figure 10:
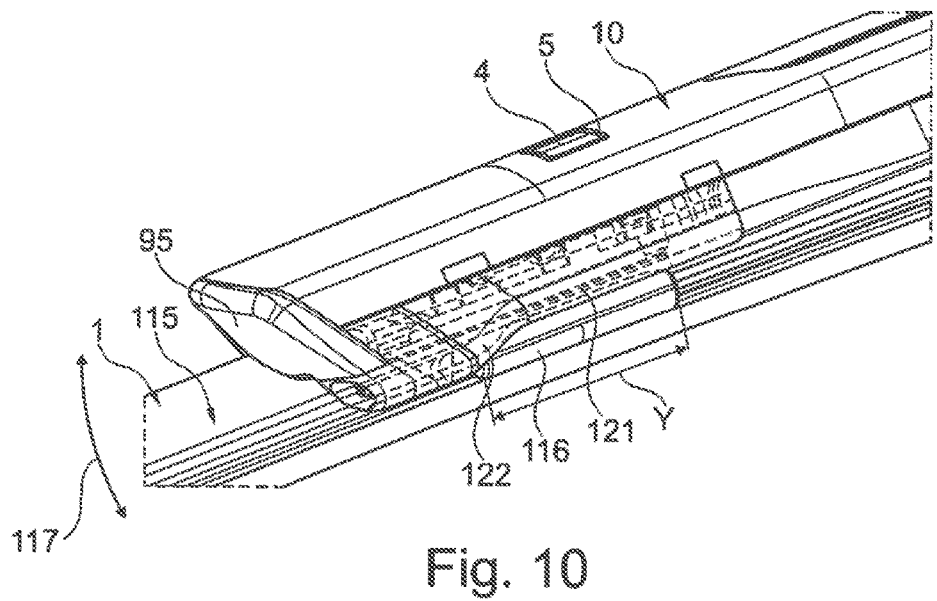
Figure 11:
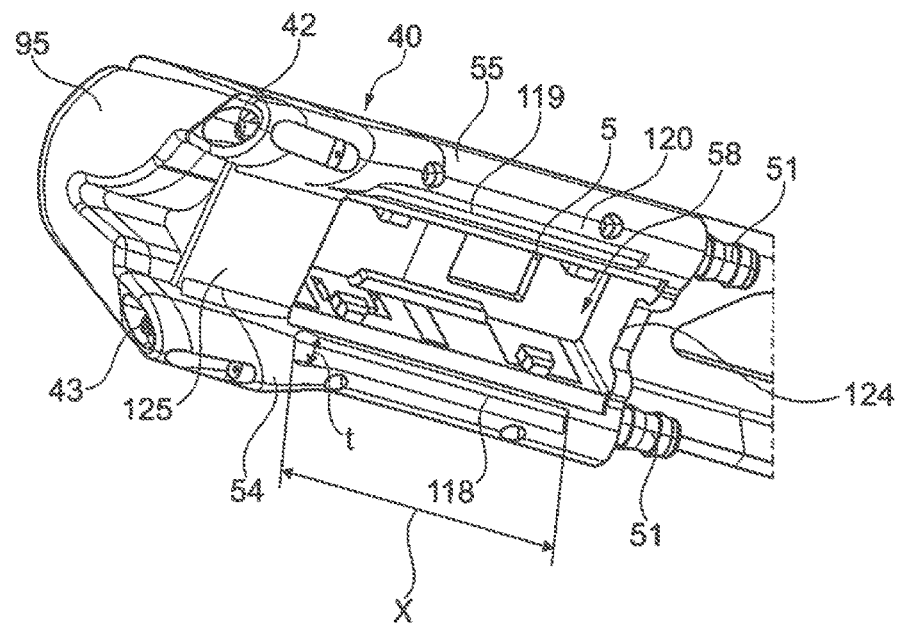
Figure 12:
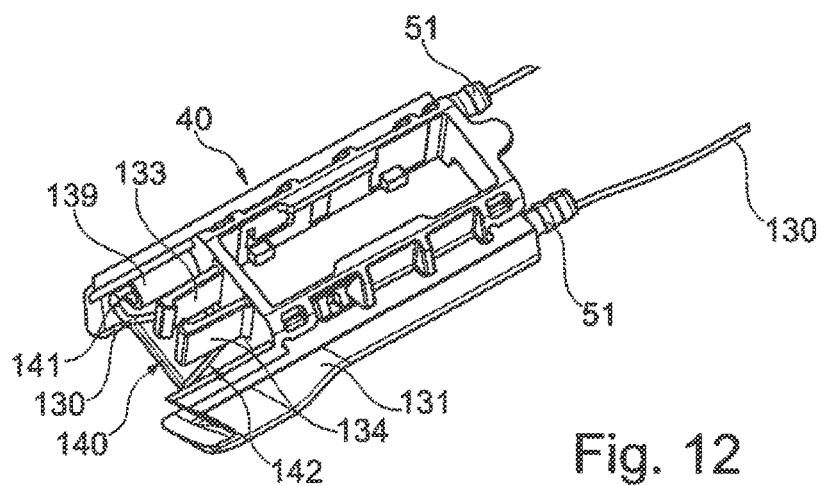
Figure 13:
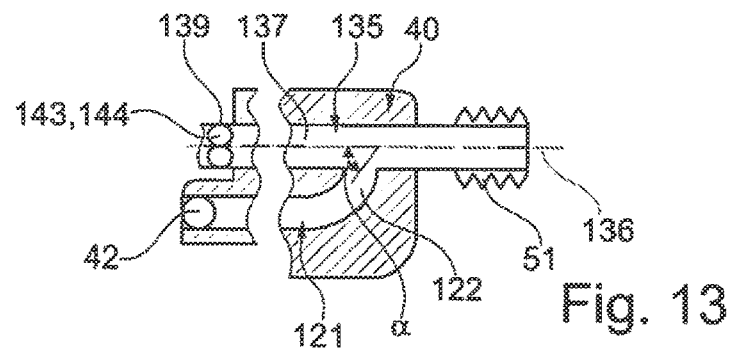
Figure 14:
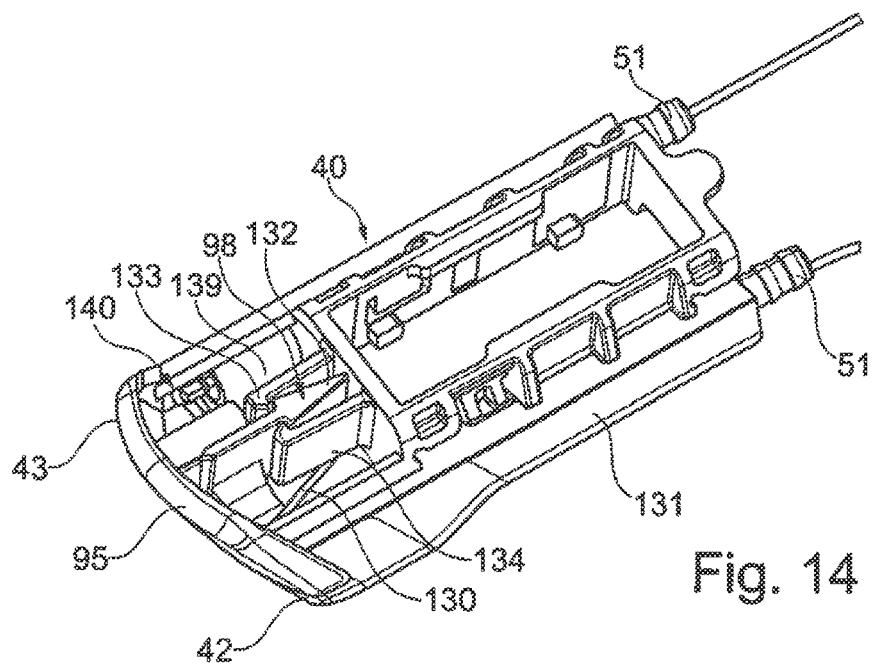
Figure 15:
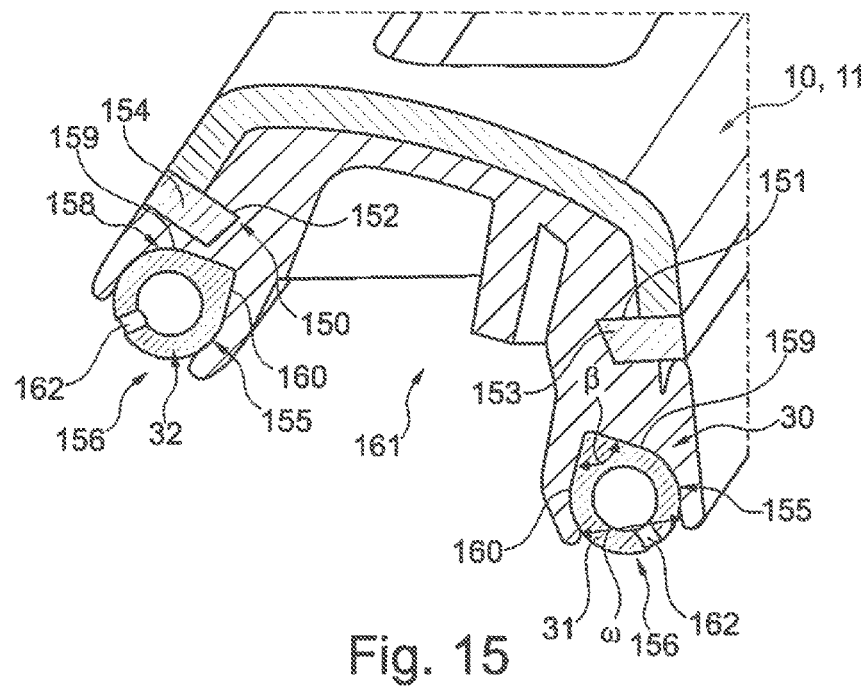
Figure 18:
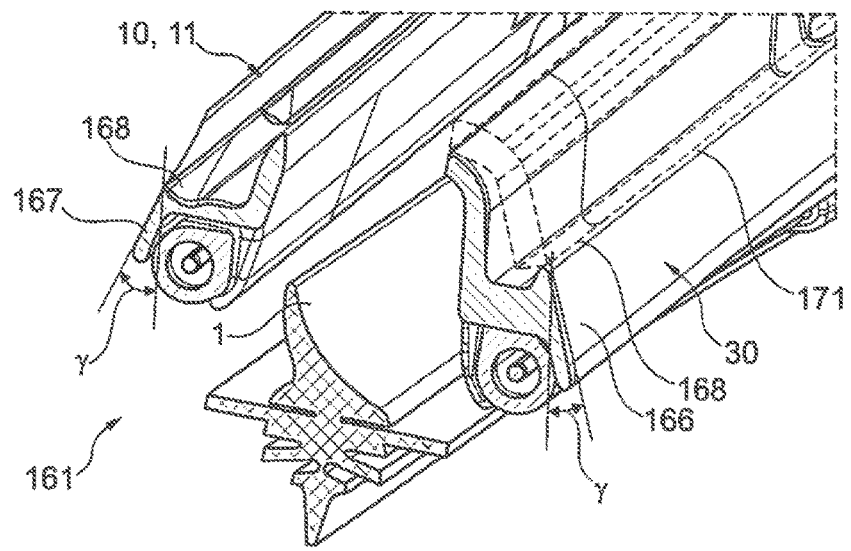
Figure 16:
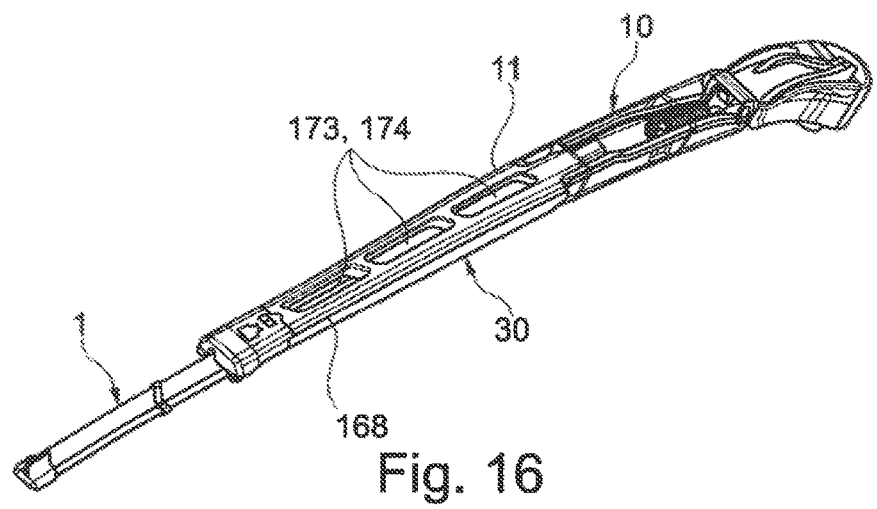
Figure 17:
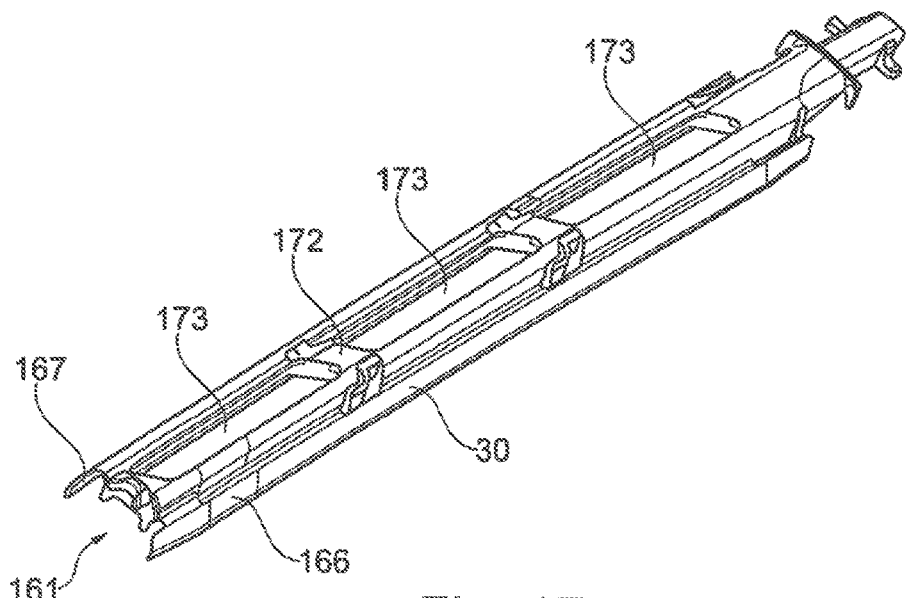
Figure 19:
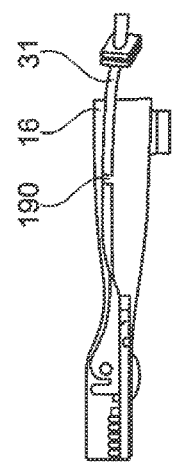
Figure 21:
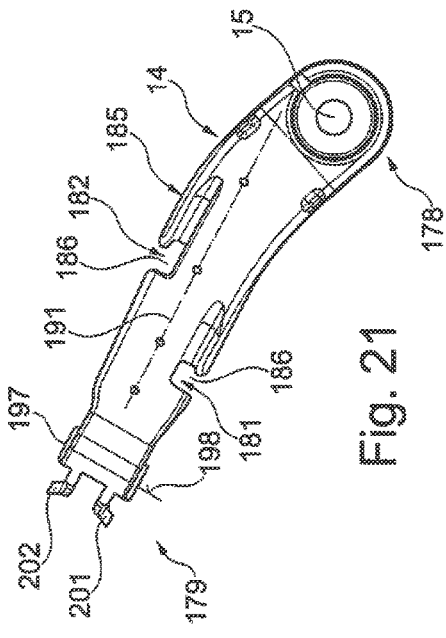
Figure 20:
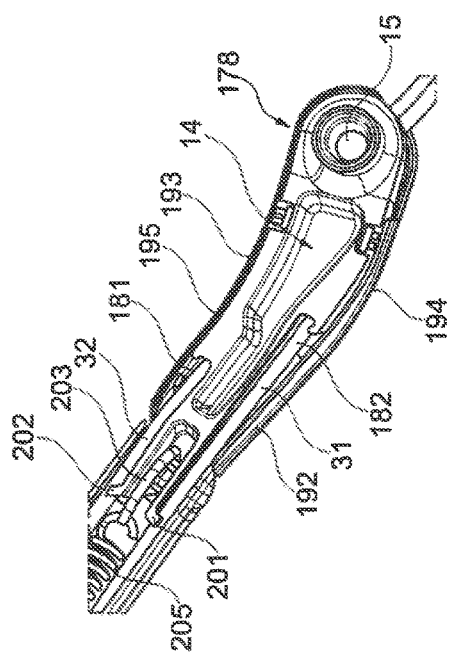
Figure 22:
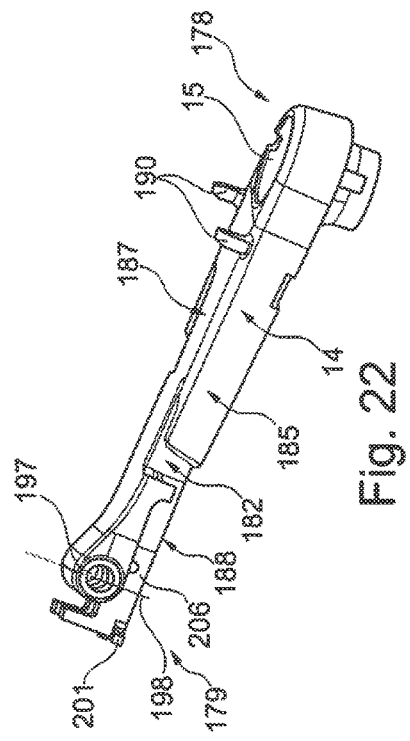
Figure 23:
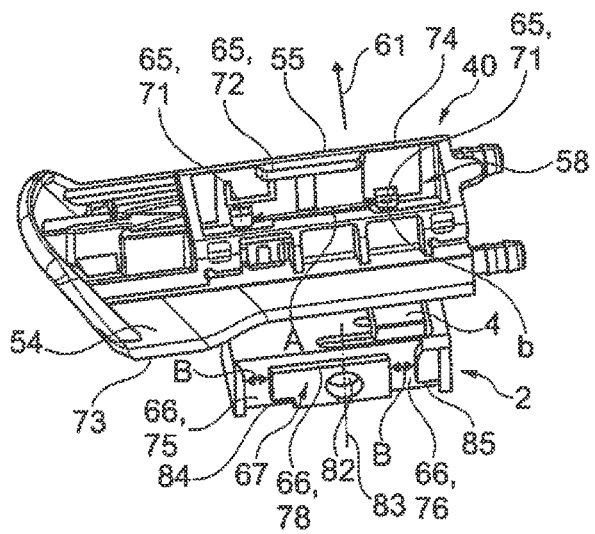
Figure 24:
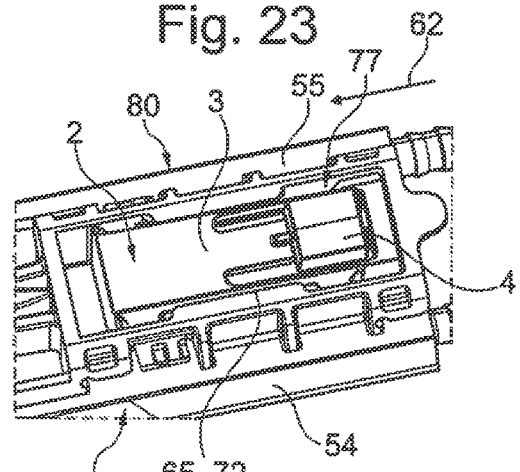
Figure 25:
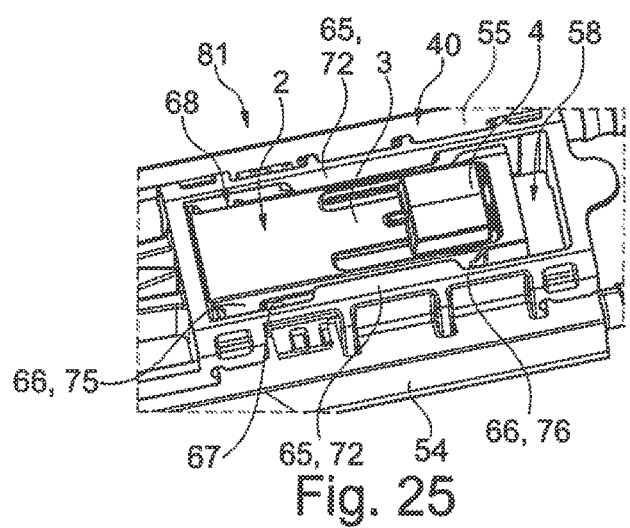

In the drawing:

FIG. 1 shows a wiper device for cleaning vehicle windows in a perspective view,

FIG. 2 shows the constituent parts of the cleaning arrangement as per FIG. 1 in a perspective exploded illustration, FIG. 3 shows the region between a fastening arrangement for the wiper blade and a cleaning arrangement of the wiper device in a plan view, FIG. 4 shows a view in the direction of the arrows IV-IV of FIG. 3, FIG. 5 and FIG. 6 each show, in different perspective views, the cleaning arrangement and a subregion of the wiper arm in the case of a connection between the cleaning arrangement and the wiper arm by way of a bayonet connection, FIG. 7 and FIG. 8 each show a subregion of the wiper arm and a cleaning arrangement, wherein the cleaning arrangement is connected to the wiper arm by way of an engagement connection, in each case in a perspective view, FIG. 9 shows a perspective view of a cleaning arrangement and of a subregion of a wiper arm, in the case of which the cleaning arrangement is slid into the wiper arm, FIG. 10 shows the fastening region of the wiper blade to the wiper arm in a perspective illustration, FIG. 11 shows a view from below of the cleaning arrangement of FIG. 10 in a perspective illustration, FIG. 12 shows the cleaning arrangement in a further perspective illustration, wherein the cleaning arrangement can be closed by way of a separate closure cap, FIG. 13 is an illustration, in longitudinal section, of ducts which are arranged in the cleaning arrangement as per FIG. 12 for the purposes of guiding a heating wire, FIG. 14 shows the cleaning arrangement as per FIG. 12 with closure cap mounted thereon in a perspective view, FIG. 15 shows a cross section through the wiper arm in the region of two liquid hoses with spray openings formed therein, FIG. 16 shows the wiper device as per FIG. 1 in a further, partially sectional or cutaway perspective illustration, FIG. 17 shows, in a perspective detail illustration, an auxiliary element in the form of a spray body arranged within the wiper arm, FIG. 18 shows a cross section through the region of the wiper arm as per FIG. 16, FIG. 19 is an illustration of the wiper arm head of the wiper arm, FIG. 20 shows a view from below of the wiper arm head as per FIG. 19 in a perspective illustration, FIG. 21 and FIG. 22 show the wiper arm heed in each case in a perspective illustration from different perspectives, and FIG. 23 to FIG. 25 show a part of the fastening arrangement of the wiper blade and the cleaning arrangement in a perspective illustration during various mounting steps.

Identical elements or elements of identical function are denoted in the figures by the same reference designations.

FIG. 1 illustrates, in a perspective illustration, a wiper device 100 for cleaning a vehicle window (not shown), in particular a front window of the vehicle. The wiper device 100 has a wiper blade 1 which is in particular in the form of a so-called flat wiper blade. The wiper blade 1 is fastened exchangeably to a wiper arm 10. The wiper arm 10 comprises an elongate wiper arm rod 11 which is composed of metal or plastic and which acts as a carrier element and which is fastened pivotably, by way of a pin 12 and a sleeve 13 (FIG. 2), to a wiper arm head 14, which is composed in particular of aluminium (alternatively plastic). The wiper arm head 14 has, on the side averted from the wiper arm carrier 11, a through-opening 15 for the purposes of fastening the wiper arm head 14 rotationally conjointly to a wiper shaft (not shown) which is connected at least indirectly to a wiper bearing or to a wiper motor. The wiper arm head 14 is mounted so as to be pivotable about a wiper arm axis 17 and is, at least in the region of the through-opening 15, covered by a closure cap 16.

The wiper arm rod 11 has, over its entire length, a substantially U-shaped cross section with a top side 15 and with two side was 19, 20 which project approximately at right angles from the top side 18 in the direction of the vehicle window. As viewed in the longitudinal direction of the wiper arm rod 11, said wiper arm rod forms, on the side averted from the wiper arm head 14, a mount or a first mount region 21 for the fastening of the wiper blade 1, this being adjoined in the direction of the wiper arm head 14 by a second mount region 22. An elongated moulded part which is composed of plastic and which is in the form of a spray body 30 is arranged within the second mount region 22. As can be seen from FIG. 1, the spray body 30 laterally terminates approximately flush with the two side was 19, 20 of the wiper arm carrier 11. Furthermore, the spray body 30 projects, below the two side walls 19, 20, out of the second mount region 22 of the wiper arm rod 11.

Furthermore, within the second mount region 22, in particular within the cross section of the spray body 30, there are arranged two cleaning hoses 31, 32 (FIG. 2) which serve for the supply of cleaning liquid. The two cleaning hoses 31, 32 are arranged within the spray body 30 on opposite longitudinal sides of the wiper blade 1.

Within the first mount region 21 of the wiper arm rod 11, there is received a cleaning arrangement 40 which is in the form of a separate component composed of plastic. In particular, the cleaning arrangement 40 is arranged on that end region of the wiper arm rod 11 or of the wiper arm 10 which is averted from the wiper arm head 14. The fastening of the cleaning arrangement 40 within the first mount region 21 of the wiper arm rod 11 may be realized in a variety of ways, as will be discussed in more detail below.

The cleaning arrangement 40 has, on the side averted from the wiper arm head 14, a front end face 41 which simultaneously forms an and face of the wiper arm 10. By way of example, in the region of the front end face 41, there are arranged two first spray nozzles 42, 43, whose spray jets 45, 46, which can be seen in FIGS. 3 and 4, are oriented so as to be inclined at an angle with respect to the longitudinal direction of the wiper arm carrier 11 in the direction of the vehicle window. It is furthermore essential that the two first spray nozzles 42, 43 are arranged such that the spray jets 45, 46 can apply the cleaning liquid to the vehicle window in front of different longitudinal sides of the wiper blade 1. Furthermore, by way of example, the cleaning arrangement 40 has, in the region of its opposite longitudinal sides, in each case two second spray nozzles 47, 48 for the cleaning liquid, which spray nozzles generate spray jets 49, 50 which are likewise oriented at an angle with respect to the longitudinal axis of the wiper arm rod 11 in the direction of the vehicle window, wherein the orientation is furthermore in the direction of the side averted from the wiper arm head 14.

For the supply of the cleaning liquid to the cleaning arrangement 40 via the cleaning hoses 31, 32, the cleaning arrangement 40 has, on the side facing toward the wiper arm head 14 and in the region of its two longitudinal sides, in each case one feed connector 51, onto which the respective cleaning hose 31, 32 is pushed. Furthermore, the two cleaning hoses 31, 32 have, as can be seen in particular when viewing FIG. 1 and FIG. 15 together, spray nozzles 162 for generating additional spray jets 52 which are likewise directed toward the vehicle window and which strike the vehicle window on both sides of the wiper blade 1. A cleaning arrangement 40 as described up to this point makes it possible, together with the two cleaning hoses 31, 32, and by way of a supply of cleaning liquid which is controlled in a manner dependent on the wiping direction 53 of the wiper blade 1, for cleaning liquid to be applied to the vehicle window in each case in front of the longitudinal side of the wiper blade 1 in the movement direction of the wiper blade 1.

The cleaning arrangement 40 has two side wails 54, 55 (FIG. 3) which, at least in certain regions, run flush with the inner sides of the side walls 19, 20 of the wiper arm rod 11 in the region of the first mount region 21. Furthermore, the cleaning arrangement 40 has a through opening 57. The cleaning arrangement 40 forms an additional mount region 58 which is of approximately U-shaped form in cross section and which has an aperture in the region of the through-opening 57. In particular, the cleaning arrangement 40 which is received within the wiper arm 10 or the first mount region 21 serves for the fastening of the wiper blade 1. For this purpose, the wiper blade 1 has a wiper blade adapter, only certain areas of which are illustrated in the figures, and which has a fastening arrangement 2.

The fastening arrangement 2 has, on the side facing toward the top side 18 of the first mount region 21, a spring tongue 3 with an engagement button 4 which, in the mounted state of the wiper blade 1 or of the fastening arrangement 2 on the wiper arm 10, engages in positively locking fashion into an opening 5 formed in the top side 18 of the wiper arm 10. In particular, the engagement button 4 forms, together with the opening 5, an engagement connection between the wiper blade 1 and the wiper arm 10, by way of which engagement connection the wiper blade 1 or the fastening arrangement 2 is secured on the wiper arm 10, wherein, after the engagement connection has been released, the wiper blade 1 can be dismounted from the wiper arm 10, in particular in order to permit an exchange of the wiper blade 1.

As can be seen in particular from the illustration of FIGS. 1 and 4, both the fastening arrangement 2 and the cleaning arrangement 40 are arranged, at least in certain areas, within the first mount region 21 of the wiper arm 10 or of the wiper arm rod 11. Furthermore, in the mounted state of the fastening arrangement 2, the additional mount region 58 of the cleaning arrangement 40 encompasses the fastening arrangement 2, whereas the first mount region 21 of the wiper arm 10 encompasses the cleaning arrangement 40. Corresponding to the illustration of FIGS. 1 and 2, provision may also be made whereby the cleaning arrangement 40 is, on the side facing toward the spray body 30, laterally covered in certain areas by the spray body 30, for example by way of two lugs 59, 60 arranged on the spray body 30 on the longitudinal sides thereof.

On the basis of FIGS. 23 to 25, the connection between the fastening arrangement 2 of the wiper blade 1 and the cleaning arrangement 40 will now be discussed in more detail: here, FIG. 23 shows the fastening arrangement 2 before the mounting thereof on the cleaning arrangement 40. For the mounting of the fastening arrangement 2 on the cleaning arrangement 40, the fastening arrangement 2 is moved relative to the cleaning arrangement 40 in the direction of a first mounting direction 61, which runs perpendicular to the longitudinal direction of the wiper arm 10. FIGS. 24 and 25 illustrate the state in which the fastening arrangement 2 is arranged within the additional mount region 58 of the cleaning arrangement 40 and, there, can be moved no further in the direction of the first mounting direction 61. Subsequently, a relative movement of the fastening arrangement 2 with respect to the cleaning arrangement 40 is performed in the direction of a second mounting direction 62 (FIG. 24), wherein the second mounting direction 62 runs perpendicular to the first mounting direction 61. In the final state illustrated in FIG. 25, the fastening arrangement 2 is (fully) mounted on the cleaning arrangement 40, wherein, at the same time, the engagement button 4 of the fastening arrangement 2 is engaged with the opening 5 on the top side 18 of the wiper arm 10 (not shown).

To form a guide between the fastening arrangement 2 and the cleaning arrangement 40 during the mounting along the two mounting directions 61, 62, the fastening arrangement 2 and the cleaning arrangement 40 have first and second guide means 65, 66 which cooperate with one another. The first guide means 65 are for example formed, in the form of first elevations 71 and second elevations 72, in the region of the cleaning arrangement 40, on the inner side of the two side walls 54, 55, which are arranged parallel to one another, of the cleaning arrangement 40. The first elevations 71 are formed in the form of cams which, in the region of a lower edge 73 of the cleaning arrangement 40, are arranged with a spacing A to one another. By contrast, the second elevation 72 is arranged in the region of a top edge 74 of the cleaning arrangement 40 and has an elongated shape. In particular, the second elevation 72, which is arranged between the two first elevations 71 as viewed in the longitudinal direction of the cleaning arrangement 40, simultaneously serves as an axial abutment for the fastening arrangement 2 when the latter is inserted into the cleaning arrangement 40 in the direction of the first mounting direction 61.

The first elevations 71 on the cleaning arrangement 40 cooperate with in each case one depression 75, 76 as second guide means 66, which are formed on in each case an outer side of a side wall 67, 68 of the fastening arrangement 2. In particular, the two depressions 75, 76 have in each case a width B slightly larger than a width b of the two first elevations 71, such that, in the position of the fastening arrangement 2 illustrated in FIG. 24, there is movement play 77 in the cleaning arrangement 40 in the direction of the second mounting direction 62. The depressions 75, 76 transition, in the direction of the top side, which faces toward the spring tongue 3, of the fastening arrangement 2, into an elongated depression 78.

Viewed overall, the first and second guide means 65, 66 serve, during the mounting process, to guide the fastening arrangement 2 between the starting position 80 illustrated in FIG. 24 and the end position 81 illustrated in FIG. 25. Furthermore, by way of corresponding geometric dimensioning of the guide means 65, 66, it is ensured that the movement play 77 that is initially provided in the starting position 80 is reduced to zero in the end position 81, that is to say the fastening arrangement 2 is, in the end position 81, received without play within the cleaning arrangement 40. By way of the discussed geometric dimensioning, it is the case here that the movement play 77 decreases preferably in continuous fashion between the starting position 80 and the end position 81.

It can be seen in FIG. 23 that the fastening arrangement 2, which is pert of the wiper blade adapter (not illustrated) for the fastening of the wiper blade 1 to the wiper arm 10, has an opening 82 which forms an axis of rotation 83, with the wiper blade 1 being mounted in the fastening arrangement 2 so as to be pivotable about said axis of rotation. Furthermore, it can be seen that the first elevations 71 are, in relation to the additional mount region 58 in the cleaning arrangement 40 or in relation to the depressions 75, 76 of the fastening arrangement 2, arranged at corner regions of the fastening arrangement 2 and of the cleaning arrangement 40, wherein the axis of rotation 83 is arranged between the first elevations 71. Finally, it can be seen from FIG. 23 and FIG. 25 that, by way of the depressions 75, 76 or the delimiting surfaces 84, 85 thereof, in the end position 81, the delimiting surfaces 84, 85 act as an abutment in order to limit the relative movement between the cleaning arrangement 40 and the fastening arrangement 2.

Different fastening types between the cleaning arrangement 40 and the first mount region 21 on the wiper arm 10 or on the wiper arm rod 11 will now be discussed with reference to FIGS. 5 to 9. All of the fastening types have in common the fact that the cleaning arrangement 40 is in each case directly connected to the wiper arm 10. FIGS. 5 and 6 will be discussed first, from which figures it can be seen that the connection between the cleaning arrangement 40a and the wiper an 10a is realized by way of a bayonet connection 88. For this purpose, as can be seen most clearly from FIG. 6, the wiper arm 10a has, on the inner side of the two side wails 19, 20, two projections 89, 90 which are spaced apart from one another as viewed in the longitudinal direction. The projections 89, 90 cooperate with cutouts 91, 92 formed on the cleaning arrangement 40a, Whereas the cutouts 91 formed in the region of the side walls 54a, 55a of the cleaning arrangement 40a are situated in an approximately central region in relation to the longitudinal extent of the cleaning arrangement 40a, the cutouts 92 are arranged on the side averted from the front face end face 41a, and terminate with an end face 93. Furthermore, the cutouts 91 are of L-shaped form, whereas the cutouts 92 are in the form of elongated cutouts. A bayonet connection 88 of said type enables the cleaning arrangement 40a to be mounted on the wiper arm 10a by virtue, for example, of the wiper arm 10a firstly being connected to the cleaning arrangement 40a in the direction of the first mounting direction 61a, wherein the projections 69 engage into the vertical part of the cutouts 91. When the projections 89 bear against the underside of the cutouts 91, a movement of the wiper arm 10a takes place in the direction of the second mounting direction 62a, wherein the projections 89, 90 cooperate with the cutouts 91, 92 which are each oriented or arranged in the longitudinal direction of the cleaning arrangement 40a. The relative movement between the wiper arm 10a and the cleaning arrangement 40a is limited by virtue of the projections 89, 90 bearing in each case against those delimitations of the cutouts 91, 92 which face toward the end face 41a. Here, the rear side 94 of a closure cap 95 which is connected by way of an engagement connection 96 to the cleaning arrangement 40a is still arranged with a minimal spacing to the front end face 97 of the wiper arm 10a. To prevent an inadvertent detachment of the cleaning arrangement 40a from the wiper arm 10a, an engagement cam 87 is arranged with resilient action in the vertical section of the cutout 91. The engagement cam 87 projects into the movement travel of the projection 89 and is pushed inward by said projection during the insertion into the cutout 91. When the projection 89 is situated in the horizontally arranged section of the cutout 91, the engagement cam 87 springs back into its original position and forms an abutment for the projection 89 in the event of a movement of the cleaning arrangement 40a counter to the direction of the mounting direction 62a.

FIG. 7 illustrates the situation in which the wiper arm 10b is connected to the cleaning arrangement 40b by way of an engagement connection 98. For this purpose, the two side walls 54b, 55b of the cleaning arrangement 40b have, in their upper region, in each case two engagement cams 99 which are spaced apart from one another axially in relation to the longitudinal direction of the cleaning arrangement 40b and which, from the position illustrated in FIG. 7, are elastically deformable for example into a position offset in the direction of the side walls 54b, 55b. In the region of the wiper arm 10b, the latter has, on the inner side of the two side walls 19, 20, projections which are arranged, in FIG. 5, in overlap with the engagement cams 99 (analogously to the projections 89, 90 in the case of the wiper arm 10a) and which, during the relative movement of the wiper arm 10b in the direction of the mounting direction 101 toward the cleaning arrangement 40b, cause the engagement cams 99 to be pushed in and to subsequently be locked to the wiper arm 10b. Here, it is essential that, by way of a corresponding design of the engagement cams 99, easy release of the cleaning arrangement 40b from the wiper and 10b is made possible.

The engagement connection 102 illustrated in FIG. 8 differs from the engagement connection 98 in that, on the cleaning arrangement 40c, in the region of the two side walls 54c, 55c, there are respectively arranged elongated barbs 103 which, in forming the engagement connection 102, cooperate with the projections arranged in the region of the wiper arm 10c in such a way that the engagement connection 102 can no longer be released again.

FIG. 9 illustrates the situation in which the cleaning arrangement 40d is connected to the wiper arm 10d by way of a positively locking connection 105. The positively locking connection 105 has, on the wiper arm 10d, elongated projections or guide elements 106, 107 which project inward from the side walls 19, 20 of said wiper arm and which cooperate with counterpart elements in the form of groove-like, elongated cutouts 108 in the region of the two side walls 54d, 55d of the cleaning arrangement 40d. It is thereby possible for the cleaning arrangement 40d to be inserted by way of a linear movement into the (open) cross section of the first mount region 21 of the wiper arm 10d in the direction of the mounting direction 109, wherein the guide elements 106, 107 pass into the cutouts 108 and, in so doing, fix the cleaning arrangement 40d in a direction running perpendicular to the mounting direction 109. The axial movement or the sliding-in movement of the cleaning arrangement 40d is likewise limited by the rear side 94 of the closure cap 95. Furthermore, in order to prevent the cleaning arrangement 40d from inadvertently being pulled out of the wiper arm 10d, provision may be made for an engagement connection to be formed between the cleaning arrangement 40d and, for example, the spray body 30, for which purpose, for example, the cleaning arrangement 40d has engagement hooks 110.

In FIGS. 10 and 11, a further detail of the pivotable fastening of the wiper blade 1 to the wiper arm 10 will now be discussed. In particular, it can be seen on the basis of FIG. 10 that the wiper blade 1, in particular the wiper blade body 115 thereof, is connected by way of a wiper blade adapter to the wiper arm 10 or to the cleaning arrangement 40, which, aside from the fastening arrangement 2, has an adapter element 116 which is fastened to the wiper blade body 115 and which is pivotably connected to the fastening arrangement 2 in the region of the through-opening 57 of the fastening arrangement 2. The adapter element 116 has a length Y as viewed in the longitudinal direction of the wiper blade 1.

To make it possible for the wiper bade 1 to be pivoted through as great as possible a pivot angle in the direction of the double arrow 117 (FIG. 10) relative to the wiper arm 10, the wiper arm 10, in particular the cleaning arrangement 40, has two elongated cutouts 118, 119 which can be seen in FIG. 11. The two cutouts 118, 119 each have a length X slightly greater than the length Y of the adapter element 116. In particular, in the mounted state of the wiper blade 1 on the cleaning arrangement 40, the adapter element 116 projects into the two cutouts 118, 119. As viewed over their length, the two cutouts 118, 119 each have an at least substantially constant cross section. They proceed from the underside 120 of the cleaning arrangement 40 and project into the side was 54, 55 of the cleaning arrangement 40 at the inner side thereof. In particular, provision may be made whereby, correspondingly to the illustration of FIG. 11, the depth t of the respective cutout 118, 119 increases slightly on the side facing toward the first spray nozzles 42, 43 in order to increase the possible pivot angle of the adapter element 116.

Viewing FIGS. 10 and 11 together, it can furthermore be seen that the two feed connectors 51 of the cleaning arrangement 40 are situated approximately at the level of the cutout 118, 119, in the same way as the two first spray nozzles 42, 43. FIG. 10 shows a connecting duct 121 which connects a feed connector 51 to a first spray nozzle 42 or 43. The connecting duct 121 runs, in the region of the cutout 118, 119, at least approximately parallel to the cutout 118, 119 and is hydraulically connected to the respective first spray nozzle 42, 43 and to the respective feed connector 51 by way of as section 122 of curved form.

From FIG. 11, it can also be seen that the two side walls 54, 55 of the cleaning arrangement 40 are, on both sides of the cutouts 118, 119, connected to one another by way of two transverse connecting elements 124, 125 which permit stiffening of the cleaning arrangement 40, wherein the two transverse connecting elements 124, 125 are arranged outside the further mount region 58 for the fastening arrangement 2 or the adapter element 116.

Below, the arrangement of a heating element in the form of a heating wire 130, which extends within the cleaning arrangement 40, will be discussed with reference to FIGS. 12 to 14. For this purpose, the cleaning arrangement 40 has a main body 131 which is connected by way of the closure cap 95, as already described above, by way of the engagement connection 98. The engagement connection 98 has, on the closure cap 95, an engagement hook 132 which, in the locking position, cooperates with two counterpart engagement elements 133, 134 arranged on both sides of the engagement hook 132. In particular, the closure cap 95 serves, in the installed state of the cleaning arrangement 40 on the wiper arm 10, to close off, in a surface-flush manner, the first mount region 21, which is open at the end side, of the wiper arm 10.

From FIG. 13, it can be seen that the two feed connectors 51 are connected to the respective first spray nozzle 42, 43 by way of the connecting duct 121. From the connecting duct 121, in the transition region to the section 122, there extends in each case one branch 135 with a section 137, wherein the section 137 forms a rectilinear elongation of a longitudinal axis 136 of the connecting duct 121. In this way, the section 122 runs at an angle α with respect to the longitudinal axis 136. On the side averted from the branch 135, the section 137 has a mouth region 139 which opens out within a connecting chamber 140 formed between the closure cap 95 and the main body 131. The section 137 or the mouth region 139 furthermore forms a feed port 141 in the connecting chamber 140.

Within the two connecting ducts 121, between the respective feed connector 51 and the branch 135 and within the two sections 137 and in the connecting chamber 140, the (single) heating wire 130 is led at least substantially horizontally. For this purpose, the heating wire 130 is, in the region of the connecting chamber 140, arranged in the forms of a loop 142 below the two counterpart engagement elements 133, 134, in order to make it possible for the engagement hook 132 to interact, without making contact with the heating wire 130, with the two counterpart engagement elements 133, 134.

To hydraulically seal off the section 137 in order that no cleaning liquid can pass into the region of the connecting chamber 140, it is for example the case that a seal element 143 or a seal compound 144 is arranged within the respective mouth region 139. Furthermore, provision may be made whereby the connecting chamber 140 itself is also hydraulically sealed off to the outside by way of corresponding measures. It is also pointed out that the feed port 141 is of tubular form, or has a hollow cross section, in the region of the connecting chamber 140.

For the mounting of the heating wire 130 in the cleaning arrangement 40, the heating wire 130 is laid in the main body 131 corresponding to the illustration in FIG. 13. It is pointed out, merely in supplementary fashion, that the heating wire 130 is also arranged or led within the cleaning hoses 31, 32 in order to heat these as well as the cleaning arrangement 40. After the mounting of the heating wire 130 in the main body 131, it is the case, corresponding to the illustration of FIG. 14, that the closure cap 95 is connected by way of the engagement connection 96 to the main body 131 in order to close off the connecting chamber 140 or the main body 131.

A detail regarding the fastening or guidance of the two cleaning hoses 31, 32 in the region of the spray body 30, which is in the form of a moulded part, will be discussed in more detail below in FIG. 15. In particular, the spray body 30 is at least substantially foamed over the entire length of the two cleaning hoses 31, 32 in the region of the wiper arm rod 11. The spray body 30 is connected to the wiper arm rod 11 by way of an engagement connection 150. For this purpose, the spray body 30, which has approximately a U-shaped cross section, has two grooves 151, 152 which run in a longitudinal direction and into which inwardly projecting sections 153, 154 of the cross section of the wiper arm rod 11 engage in positively locking fashion and fix the spray body 30 to the wiper arm rod 11 in a direction running perpendicular to its longitudinal extent.

On the underside averted from the wiper arm rod 11, the spray body 30 has in each case one mount 155 for receiving the respective cleaning hose 31, 32 in positively locking fashion, having in each case one insertion slot 156, the opening width w of which is slightly smaller than the cross section of the cleaning hose 31, 32 in the unloaded state of the cleaning hose 31, 32, such that the respective cleaning hose 31, 32 is held in the mount 155 by way of a clamping action.

The cleaning hose 31, 32, which is formed from a plastics material as an extruded part, has the same cross section over its entire length. In particular, the cross section of the cleaning hose 31, 32 within the mount 155 is characterized in that the cleaning hose 31, 32 has a non-circular region 158. The non-circular region 158 is formed by two planar outer wall sections 159, 160 which are arranged at an angle β with respect to one another. Such a design of the cleaning hose 31, 32 has the effect that said cleaning hose is not only held within the mount 156 by way of a clamping action but also assumes a position with a fixed angle of rotation. For the positively locking mounting of the cleaning hose 31, 32, the mount 155 thereof is furthermore of identical but inverse design with respect to the outer contour of the cleaning hose 31, 32, wherein the angle β between the two outer wall sections 159, 160 is at most 90°.

The cleaning hoses 31, 32 have, in particular, multiple spray nozzles 162 which are arranged so as to be spaced apart from one another in the longitudinal direction at uniform intervals and which are in the form of through-openings for forming the additional spray jets 52 (FIG. 1). The spray nozzles 162 are situated in the region of the insertion slot 156. Between the two mounts 155 for the two cleaning hoses 31, 32, the spray body 30 forms a mount region 161 for the wiper blade 1 (not illustrated in FIG. 15). In this way, by way of a corresponding supply of the cleaning liquid to the two cleaning hoses 31, 32, it is possible, in a manner dependent on the movement direction of the wiper blade 1 or of the wiper arm 10, for cleaning liquid to be applied to the vehicle window in each case in front of the wiper blade 1 by way of the spray nozzles 162. As already discussed above, the cleaning hoses 31, 32 are in turn connected to the cleaning arrangement 40 which has the first and second spray nozzles 42, 43 and 47, 48.

FIGS. 16 to 18 illustrate further details of the wiper arm 10 or of the wiper arm rod 11 which serves as carrier element, of the spray body 30 which is designed and/or acts as an auxiliary element, and of the wiper blade 1. In particular, it can be seen from FIG. 18 that the spray body 30 has two air-guiding sections 166, 167 which extend in the longitudinal direction of the wiper arm 10 or of the wiper arm rod 11 and which are arranged parallel to one another and which project beyond the underside 168 of the wiper arm rod 11 on the side facing toward the vehicle window. In particular, from FIG. 18, it can also be seen that the two air-guiding sections 166, 167 are designed to be of different heights, such that, on the front side of the wiper arm 10 or of the wiper arm rod 11 in relation to a direction of travel, the air-guiding section 166 projects further from the underside 168 of the wiper arm rod 11 or of the wiper arm 10 than the air-guiding section 167 on the rear side of the wiper arm 10. Furthermore, the two air-guiding sections 166, 167 are, at least at the regions which project from the underside 165 of the wiper arm carrier 11, arranged at an oblique angle γ in relation to a vertically arranged longitudinal plane of the wiper arm 10. In a transition region 171 to the wiper arm rod 11, the two-air-guiding sections 166, 167 terminate at the outer side of the wiper arm rod 11 so as to be flush with the surface of the wiper arm rod 11.

Corresponding to the illustration of FIG. 17, the spray body 30 has a substantially U-shaped cross section with a base section 172 which connects the two air-guiding sections 166, 167, wherein the base section 172 has multiple cutouts or through-openings 173 which run in the longitudinal direction of the spray body 30 and which are at least approximately rectangular The through-openings 173 are aligned with openings 174 on the wiper arm carrier 11, as can be seen in particular from FIG. 16, wherein the openings 174 are of at least approximately the same size as the through-openings 173.

Finally, FIGS. 19 to 22 illustrate the guidance and fastening of the two cleaning hoses 31, 32 in the region of the wiper arm head 14 in more detail. In particular, it can be seen that the wiper arm head 14 has, in the region between the first end region 178, in which the through-opening 15 for the drive shaft is arranged, and the second end region 179, in which the wiper arm rod 11 is pivotably fastened, means for guiding the two cleaning hoses 31, 32. Said means comprise in particular in each case one leadthrough 181, 162 in the form of a longitudinal slot for each cleaning hose 31, 32. The longitudinal slot or the leadthrough 181, 182 has, as viewed toward the outer contour 185 of the wiper arm head 14, an opening 186 through which the respective cleaning hose 31, 32 can be inserted. While the cleaning hose 31, 32 is guided along the top side 187 of the wiper arm head 14 on the side facing toward the first and region 178, said cleaning hose is arranged above the underside 188 of the wiper arm head 14 on the side facing toward the second end region 179.

From FIGS. 19 and 22, it can also be seen that the means for guiding the two cleaning hoses 31, 32 furthermore additionally have guide projections 190. The guide projections 190 are integrally formed on the wiper arm head 14, which is composed of aluminium (alternatively plastic) and which is in the form of an injection-moulded part, and have the effect that the two cleaning hoses 31, 32 run laterally within the outer contour 185 of the wiper arm head 14, in particular in order to also permit simple fastening of the closure cap 16 on the wiper arm head 14. The closure cap 16, which has substantially a U-shaped cross section, has side walls 192, 193 which terminate flush with side surfaces 194, 195 of the wiper arm head 14.

Furthermore, it can be seen in particular from FIG. 21 that the two leadthroughs 181, 182 are arranged offset one behind the other in relation to a longitudinal axis 191 of the wiper arm head 14.

The second end region 179 has an eyelet 197 for forming a pivot axis 198. Furthermore, the means for guiding the cleaning hoses 31, 32 have two projections 201, 202 which, as viewed in the longitudinal direction, project beyond the eyelet 197 on the side situated opposite the first end region 178. Between the two projections 201, 202, there is arranged a bridging spring 203 which is bent into a C shape and which in turn is connected, on the side averted from the second end region 179, to a tension spring 205 by way of which the wiper arm rod 11 is pulled together with the wiper blade 1 in the direction of the vehicle window with a pressing force. The wiper arm head 14 has, below the eyelet 197, a guide channel 206 for the cleaning hose 31, 32, which guide channel guides the cleaning hose 31, 32 so as to be spaced apart from the eyelet 197. It is finally pointed out that the two leadthroughs 181, 182 are arranged within the lateral outer contour 185 of the wiper arm head 14.

The wiper device 100 thus described may be altered or modified in a variety of ways.

LIST OF REFERENCE DESIGNATIONS

1 Wiper blade
2 Fastening arrangement
3 Spring tongue
4 Engagement button
5 Opening
10/a/b/c/d Wiper arm
11 Wiper arm rod
12 Pin
13 Sleeve
14 Wiper arm head
15 Through-opening
16 Closure cap
17 Wiper arm axis
18 Top side of the wiper arm rod
19 Side well of the wiper arm rod
20 Side wall of the wiper arm rod
21 First mount region
22 Second mount region
30 Spray body
31 Cleaning hose
32 Cleaning hose
40/a/b/c/d Cleaning arrangement
41/a Front end face
42 First spray nozzle
43 First spray nozzle
45 Spray jet
46 Spray jet
47 Second spray nozzle
48 Second spray nozzle
49 Spray jet
50 Spray jet
51 Feed connector
52 Additional spray jet
53 Wiping direction
54/a/b/c/d Side wall 55/a/b/c/d Side wall
57 Through-opening
58 Additional mount region
59 Lug
60 Lug
61/a First mounting direction
62/a Second mounting direction
65 First guide means
66 Second guide means
67 Side wall
68 Side wall
71 First elevation
72 Second elevation
73 Bottom edge of the cleaning arrangement
74 Top edge of the cleaning arrangement
75 Depression
76 Depression
77 Movement play
78 Elongate depression
80 Starting position
81 End position
82 Opening
83 Axis of rotation
84 Delimiting surface of the depression
85 Delimiting surface of the depression
87 Engagement cam
88 Bayonet connection
89 Projection
90 Projection
91 Cutout
92 Cutout
93 End side
94 Rear side of a closure cap
95 Closure cap
96 Engagement connection
97 End face
98 Engagement connection
99 Engagement cam
100 Wiper device
101 Mounting direction
102 Engagement connection
103 Barb
105 Positively locking connection
106 Guide element
107 Guide element
108 Cutouts
109 Mounting direction
110 Engagement hook
115 Wiper blade body
116 Adapter element
117 Double arrow
118 Cutout
119 Cutout
120 Bottom side of the cleaning arrangement
121 Connecting duct
122 Curved section
124 Transverse connecting element
125 Transverse connecting element
130 Heating wire
131 Main body
132 Engagement hook
133 Counterpart engagement element
134 Counterpart engagement element
135 Branch
136 Longitudinal axis
137 Section
139 Mouth region
140 Connecting chamber
141 Feed port
142 Loop
143 Beal element
144 Seal compound
150 Engagement connection
151 Groove
152 Groove
153 Section
154 Section
155 Mount
156 Insertion slot
158 Non-circular region
159 Outer wall section
160 Outer wall section
161 Mount region
162 Spray nozzle
166 Air-guiding section
167 Air-guiding section
168 Underside of the wiper arm carrier
171 Transition region
172 Base section
173 Through-openings
174 Opening
178 First end region
179 Second and region
181 Leadthrough
182 Leadthrough
185 Outer contour of the wiper arm head
186 Opening
187 Top side of the wiper arm head
188 Bottom side of the wiper arm head
190 Guide projection
191 Longitudinal axis of the wiper arm head
192 Side wall of the closure cap
193 Side wall of the closure cap
194 Side surface of the wiper arm head
195 Side surface of the wiper arm head
197 Eyelet
198 Pivot axis
201 Projection
202 Projection
203 Bridging spring
205 Tension spring
206 Guide channel
A Spacing
B Width of the depressions
b Width
L Length
l Length
t Depth
w Opening width
Y Length
X Length
α Angle
β Angle
γ Angle

The invention claimed is:

1. A cleaning arrangement for the cleaning of vehicle windows, comprising:
a monolithic base body with at least one spray opening, wherein the monolithic base body comprises fasteners that directly connect the monolithic base body to a wiper arm, and wherein the monolithic base body has a supply connection for a cleaning fluid, which supply connection is hydraulically connected to the spray opening via a connecting duct, wherein a feed connection branches off from the connecting duct, which feed connection opens in a connecting chamber of the monolithic base body, and wherein the connecting chamber is closed by a closure cap.

2. The cleaning arrangement according to claim 1, wherein the closure cap is arranged on a face side of the monolithic base body associated with an end region of the wiper arm.

3. The cleaning arrangement according to claim 2, wherein the closure cap is constructed to close, in a surface-flush manner, the end region of the wiper arm which is open at the face side.

4. The cleaning arrangement according to claim 1, wherein the closure cap is connected with the monolithic base body by a snap-on connection.

5. The cleaning arrangement according to claim 1, wherein a heating wire is arranged within the feed connection and the connecting duct between the supply connection and a branch to the feed connection.

6. The cleaning arrangement according to claim 5, wherein two connecting ducts are provided, arranged parallel to one another, associated respectively with a longitudinal side of a wiper blade, and a single heating element is provided, which is arranged in the connecting chamber and projects with sections facing away from one another via respectively one of two of the feed connection into the respective connecting duct.

7. The cleaning arrangement according to claim 1 the feed connection and/or the connecting chamber is sealed hydraulically.

8. The cleaning arrangement according to claim 7, wherein the seal takes place by means of a sealing element and/or by a sealing material arranged in the feed connection in the opening region to the connecting chamber.

9. The cleaning arrangement according to claim 1, wherein the feed connection runs along a longitudinal axis of the connecting duct and that the spray opening and an opening region of the feed connection are arranged in the connecting chamber on the same side of the monolithic base body.

10. The cleaning arrangement according to claim 1, wherein the supply connection is arranged on the side of the connecting duct facing the wiper arm.

11. The cleaning arrangement according to claim 1, wherein the feed connection has a hollow cross-section.

12. A wiper device for the cleaning of vehicle windows, comprising:
a wiper arm;
a wiper blade fastened in an exchangeable manner on the wiper arm by a fastening arrangement; and
a cleaning arrangement according to claim 1.

13. The wiper device according to claim 12, wherein the cleaning arrangement is fastened directly on the wiper arm and the fastening arrangement is fastened directly on the cleaning arrangement.

* * * * *